May 6, 1969        P. R. JOHNSTON        3,442,227

APPARATUS FOR MANUFACTURING VARIEGATED ICE CREAM

Filed Feb. 23, 1967

INVENTOR.
PAUL R. JOHNSTON
BY E.T. McCabe
ATTORNEY.

United States Patent Office 3,442,227
Patented May 6, 1969

3,442,227
APPARATUS FOR MANUFACTURING
VARIEGATED ICE CREAM
Paul R. Johnston, Rte. 8, Box 238,
Decatur, Ill. 62525
Filed Feb. 23, 1967, Ser. No. 618,225
Int. Cl. A23g 3/02
U.S. Cl. 107—1                                6 Claims

ABSTRACT OF THE DISCLOSURE

Apparatus for introducing a liquid component into a flow of semi-frozen ice cream downstream of a freezer, particularly of advantage where the ice cream contains pieces of fruit and the like, comprising: a section of conduit having a cylinder positioned internally thereof to form an annular space through which the liquid is passed from a connecting spud in the conduit wall to a plurality of cross tubes positioned diametrically of the cylinder and spaced along its length. The liquid component is discharged from openings in the cross tubes into the flow of ice ceam through the cylinder.

---

This invention relates to an apparatus for introducing a fluid component into a flow of viscous material, and more particularly, to an apparatus for variegating syrup into a frozen confection such as ice cream.

Ice cream is now produced in a wide variety of flavors and combination fruit or nuts and flavors, and the like. Marbelized ice cream wherein a flavoring or coloring syrup is present in an eye-pleasing pattern of ribbons and swirls has become quite popular. Also, the presence of the pieces of various fruits and nuts such as bananas, cherries, pecans and the like are well received by the consumer. Numerous apparatus have been devised for introducing each of such ingredients into semi-frozen ice cream mix, usually at a point in a product line downstream from the ice cream freezer and preceding the point at which the ice cream is introduced into a consumer or bulk container. Introduction of such fluids and/or fruits, etc. in the freezer is not practical unless it is of very small particle size and homogenized product is desired.

Also introduction of a fluid has been limited to thin streams. Furthermore, it remains difficult to introduce both large particles of fruits or nuts, and the like, and a marbelizing fluid syrup into the ice cream flow. If both materials are introduced at about the same point in the product flow, the marbelizing pattern is disrupted and is unattractive. If the particulate items are introduced first, they must be limited in size so as to pass around the apparatus for subsequently introducing the fluid. Thus this procedure has not been adaptable to large particulate items. Finally, if the particulate items are added after the fluid, the latter again becomes disrupted in an unpleasing way.

Accordingly, it is an object of the present invention to devise an improved apparatus for variegating a fluid component into a flow of viscous material.

It is a further object to provide an improved apparatus for variegating a fluid syrup into a flow of ice cream confection containing relatively large particles of fruit and the like.

Generally the present invention involves an open ended cylinder inserted within the product line so as to leave an annular space between the cylinder and the inner surface of said line. The space is closed off at each end of the cylinder, and a plurality of cross tubes are positioned diametrically of the latter in communication with the annular space. Fluid is introduced into the latter space and through the cross tubes and thence into the product flow. The product may thus contain particles having a maximum diameter of nearly one-half the cylinder diameter.

Further objects and advantages will become clear upon reading the following description in conjunction with the drawings wherein.

Figures 1, 2, 3:
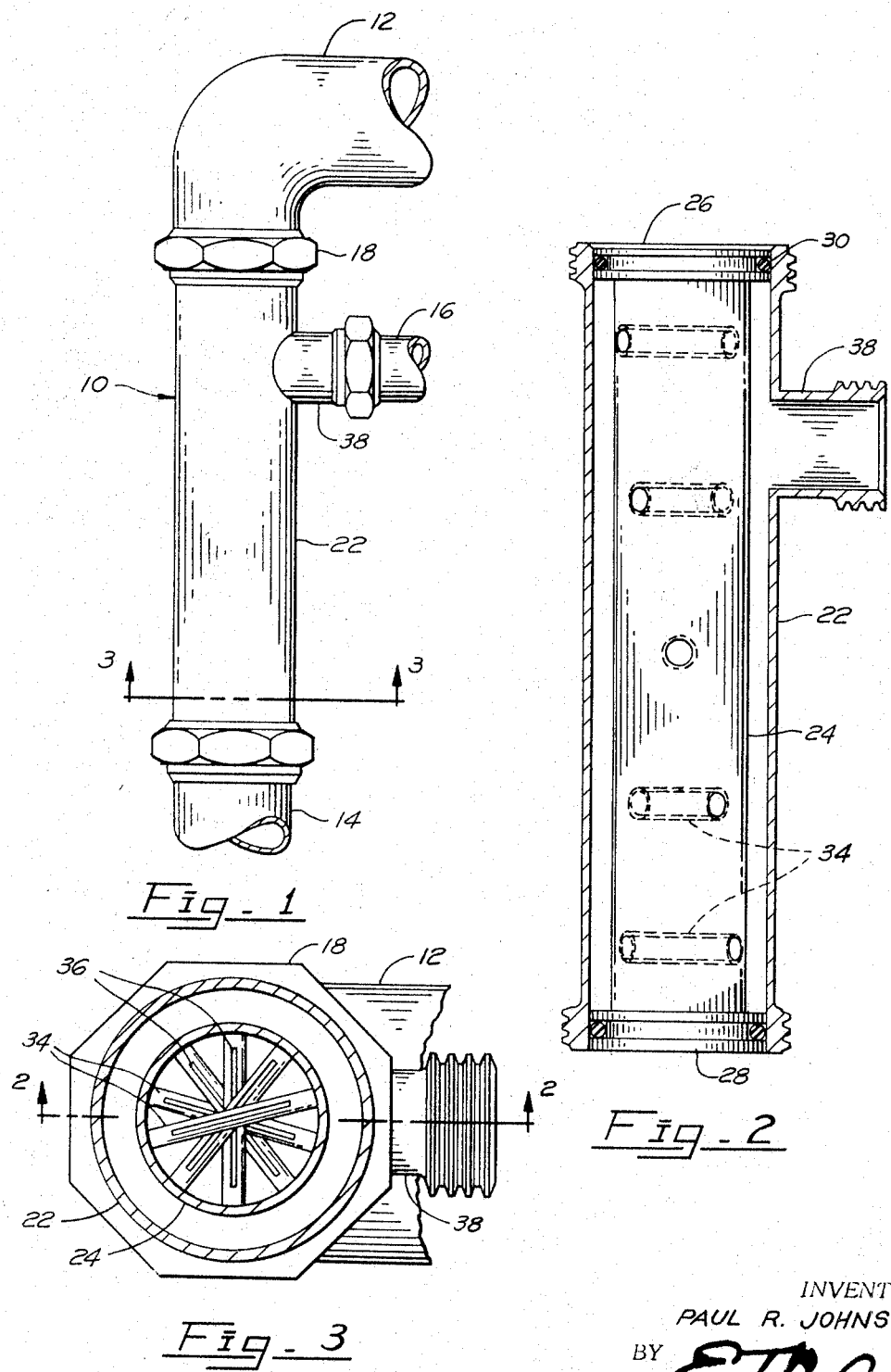
FIGURE 1 is an elevation view of the present invention connected in a product line.
FIGURE 2 is an elevation view in partial section of the present invention.
FIGURE 3 is a section view of the invention taken at line 3—3 in FIGURE 1.

The apparatus shown in the figures is an injector assembly generally 10 that is connected between a product line 12 discharging from an ice cream freezer (not shown) and emptying into a product line 14 leading to a dispenser apparatus (also not shown). The injector assembly generally 10 is also connected to a syrup supply pipe 16. Suitable sanitary couplings such as that shown at 18 connect the injector assembly generally 10 to the aforementioned lines and pipes.

As may best be seen in FIGURE 2, the apparatus is comprised of an outer sleeve 22 threaded at each end to receive the couplings 18, and containing therein a concentrically spaced cylinder 24. The latter cylinder 24 is open at each end whereat outwardly extending annular flanges 26 and 28 are closely fitted to the inner surface of the sleeve 22. O rings 30 may be utilized to form a fluid tight fit between the parts.

A plurality of cross tubes 34 are evenly spaced throughout the length of the cylinder 24. As may be seen in FIGURE 2, the cross tubes 34 are evenly spaced in the longitudinal direction of flow; and, as may be observed in FIGURES 2 and 3, the tubes are positioned diametrically in different intersecting longitudinal planes throughout the cylinder 24. Each cross tube 34 extends through openings at opposite sides of the cylinder and thus communicates at each end thereof with the annular space defined by the cylinder 24 and sleeve 22. These cross tubes 34 may be permanently implaced by soldering or the like, or may be demountably press fitted.

As may also be seen in FIGURES 3, the cross tubes 34 each contain discharge slots 36 for the ejection of a fluid component into the product flow. Preferably the slots 36 extend substantially the full diameter of the cylinder 24 and are oriented to face downstream with respect to the product flow. However, openings of other shapes and orientation may be utilized to produce various unusual effects.

It will also be noted in the figures that a spud 38 is soldered to the sleeve 22 and communicates with the interior thereof. The spud 38 is connectible to the fluid component line 16.

If desired, a spinner apparatus (not shown), which simply comprises a propeller-type element, may be mounted downstream of the aforedescribed injector assembly generally 10 to introduce an additional swirling effect in the product. Also, it will be apparent that the apparatus may be used for blending any type of liquiform or semisolid materials to provide a variegated or marbelized effect. For example, cake and pie mixes and candy mixes may be processed as well as ice cream.

In a preferred embodiment of the invention for injecting a ratio of 1 gallon of syrup per 9 gallons of ice cream at variable flow rates of up to about 1,200 gallons per hour, the injector assembly was constructed from a 3-inch I.D. stainless steel pipe sleeve to which a 1½ inch tank spud was silver soldered for the inflow of syrup. A length of 2½ inch stainless steel pipe was used for the inner cylinder. Both sleeve and cylinder were 9 inches long. Cross tubes manfactured from 5/16 inch stainless steel tubing were silver soldered at 1⅞ inch intervals, on centers (5 cross tubes), and staggered at 36 degrees with respect to one another. The latter tubes contained slots 1/16 inch by 1½ inch long.

I claim:

1. An improved apparatus for introducing a fluid component to a viscous material flowing longitudinally through a product line, said apparatus comprising: an open cylinder mounted longitudinally within a portion of said product line; flanges at opposite ends of said cylinder to space same from the inner surface of said product line and forming an enclosed annular space therebetween; a spud in said product line for connecting said annular space to a source of said fluid component; and a plurality of cross tubes spaced longitudinally from one another, said tubes extending diametrically across said cylinder at angles to one another and connected at each end of said tubes to said annular space, said cross tubes having openings therein for discharge of said fluid component into the material flow.

2. The apparatus of claim 1 wherein said cylinder and said spud are located in a threaded sleeve that is demountably connectible in a product line.

3. The apparatus of claim 2 wherein the openings in said cross tubes are slots extending substantially across said cylinder, and said slots are oriented to face in the downstream direction with respect to the material flow.

4. The apparatus of claim 3 wherein said cylinder is demountably positioned in said sleeve with O rings at each flange.

5. The apparatus of claim 1 wherein the openings in said cross tubes are slots extending substantially across said cylinder, and said slots are oriented to face in the downstream direction with respect to the material flow.

6. The apparatus of claim 1 positioned in an ice cream product line between a freezer and a dispensing means, and said spud is connected to a source of syrup.

References Cited

UNITED STATES PATENTS

| | | |
|---|---|---|
| 2,669,945 | 2/1954 | Wildebour. |
| 2,758,553 | 8/1956 | Moser. |
| 2,772,863 | 12/1956 | Harney et al. _____ 259—7 |
| 2,774,314 | 12/1956 | Moser. |
| 2,816,518 | 12/1957 | Daggett. |
| 3,109,631 | 11/1963 | Purjahn _____ 259—4 |

WALTER A. SCHEEL, *Primary Examiner.*

A. O. HENDERSON, *Assistant Examiner.*

U.S. Cl. X.R.

107—54